(12) United States Patent
Sayag

(10) Patent No.: US 6,807,551 B2
(45) Date of Patent: Oct. 19, 2004

(54) MEASURING MAXIMUM MEMORY REQUIREMENT OF AN APPLICATION AT ANY POINT THROUGH CONTINUOUS USE OF GARBAGE COLLECTOR

(75) Inventor: Moshe Sayag, Herzeliya (IL)

(73) Assignee: Sun Microsystems Inc., Palo Alto, CA (US)

( * ) Notice: Subject to any disclaimer, the term of this patent is extended or adjusted under 35 U.S.C. 154(b) by 118 days.

(21) Appl. No.: 10/315,047

(22) Filed: Dec. 10, 2002

(65) Prior Publication Data

US 2003/0200409 A1 Oct. 23, 2003

Related U.S. Application Data (60) Provisional application No. 60/375,147, filed on Apr. 22, 2002.

(51) Int. Cl.[7] .................................... G06F 17/30
(52) U.S. Cl. ........................................... 707/206
(58) Field of Search ................... 707/206; 714/20; 711/100

(56) References Cited

U.S. PATENT DOCUMENTS

| | | | | |
|---|---|---|---|---|
| 5,900,001 A | * | 5/1999 | Wolczko et al. | 707/206 |
| 5,911,144 A | * | 6/1999 | Schwartz et al. | 707/206 |
| 5,920,876 A | * | 7/1999 | Ungar et al. | 707/206 |
| 6,038,572 A | * | 3/2000 | Schwartz et al. | 707/206 |
| 6,049,810 A | * | 4/2000 | Schwartz et al. | 707/206 |
| 6,115,782 A | * | 9/2000 | Wolczko et al. | 711/100 |
| 6,314,436 B1 | * | 11/2001 | Houldsworth | 707/206 |

OTHER PUBLICATIONS

Mobile Information Device Profile (JSR–37), JCP Specification, Java 2 Platform, Micro Edition, 1.0a (Sun Microsystem Inc.)., Palo Alto, California, Dec. 2000.

* cited by examiner

Primary Examiner—Diane D. Mizrahi
(74) Attorney, Agent, or Firm—Hoffman, Wasson & Gitler, P.C.

(57) ABSTRACT

Method and apparatus are disclosed for the intensive use of garbage collection in order to determine the maximum amount of memory that is consumed by a running application. A system garbage collector executes between designated pairs of program instructions or statements. The amount of memory used by the application is known after each designated program instruction or statement, and is equal to its theoretical requirement. A developer is able to determine whether a specified memory allotment for an application is ever exceeded.

23 Claims, 4 Drawing Sheets

MEASURING MAXIMUM MEMORY REQUIREMENT OF AN APPLICATION AT ANY POINT THROUGH CONTINUOUS USE OF GARBAGE COLLECTOR

CROSS-REFERENCE TO RELATED APPLICATIONS

This Application claims the benefit of Provisional Application No. 60/375,147 filed Apr. 22, 2002. This Application is related to another U.S. patent application, entitled "Measuring the Exact Memory Requirement of an Application through Intensive Use of Garbage Collector", pending U.S. patent application Ser. No. 10/315,046 filed on even date herewith.

BACKGROUND OF THE INVENTION

1. Field of the Invention

This invention relates to improvements in computer memory management. More particularly, this invention relates to the determination of the amount of available memory in a running computer application.

2. Description of the Related Art

The terms Sun, Sun Microsystems, Java, J2ME, and the Sun logo are trademarks or registered trademarks of Sun Microsystems, Inc., in the United States of America, and other countries. All other company and product names may be trademarks of their respective companies.

The Mobile Information Device Profile (MIDP) defines a set of Java application programming interfaces (APIs) that provide an application runtime environment for mobile information devices, such as cellular telephones. MIDP is defined in the document *Mobile Information Device Profile* (JSR-37), JCP Specification, Java 2 Platform, Micro Edition, 1.0a (Sun Micro-system Inc., Palo Alto, Calif., December 2000), which is incorporated herein by reference. MIDP builds on the Connected Limited Device Configuration (CLDC) of the Java 2 Platform, Micro Edition (J2ME). MIDP applications that use the MIDP and CLDC APIs are known as MIDlets.

Mobile information devices typically have a very small memory, low-speed graphics, and slow communications performance, when compared with personal computers (PCs). While programmers commonly develop applications using personal computers as development platforms, the memory and speed limitations of the target mobile information devices must be taken into account in order for the applications to run satisfactorily on the target devices. In particular, the memory capacity in mobile information devices is often a limiting factor in program development.

In early programming languages, memory allocation and deallocation was a burden imposed directly on the programmer, who was responsible to allocate and deallocate memory blocks. This burden was essentially eliminated over 40 years ago by the invention of garbage collectors, which are programs that deallocate memory that is assigned to dead or unreachable objects. Garbage collectors have greatly improved programmer productivity, and have enhanced software reliability. They are supported by modern programming languages, such as Java. A variety of different garbage collection techniques is now known in the art.

In general it is not possible for a garbage collector to determine exactly which objects are still live. It is commonly assumed by implementers of garbage collection routines that a live object is reachable or can be proven to be referenced. Nevertheless, the inability to guarantee that an object is live inconveniences a program developer who is working in an environment in which memory is a limiting resource. As supported in most languages, garbage collection is an asynchronous process. It is typically invoked automatically by the computer system at runtime when the amount of memory allocated by the running program reaches some limit, which depends on the amount of memory actually available in the system. Therefore, the developer is generally unable to determine at any particular point in the execution of the application how much of the memory allocated to the application is actually required, and how much is merely preempted by objects that are no longer reachable. Furthermore, it is often desirable to reduce the memory requirement of an application at critical points in its execution. At present, this cannot be done deterministically in the context of small wireless devices, such as cellular telephones, using current garbage collection techniques.

SUMMARY OF THE INVENTION

In accordance with a disclosed embodiment of the invention, a developer is enabled to determine the maximum amount of memory that is consumed by a running application at any point of its execution. The system garbage collector executes between designated pairs of program instructions or statements. The amount of memory used by the application is known after each such program instruction or statement, and is equal to its theoretical requirement. In one embodiment the system garbage collector executes between all pairs of program instructions or statements in a designated range, which can be the entire application.

A developer of an application for a device with a small memory, such as a MIDP device, can use this feature of the present invention to tailor the memory requirements of the application to comply with the memory limitations of the device, even when the developer is writing the application on a workstation with a much larger memory.

The invention provides a method for evaluating maximum memory requirements of a computer application on a development platform, which is carried out by executing a sequence of program instructions in the application, running a garbage collector following execution of at least designated ones of the program instructions to free a portion of a heap memory that is no longer in use. After running the garbage collector the method is further carried out by determining a current size of the heap memory, comparing the current size of the heap memory with a previous maximum size of the heap memory, and responsively to the comparison, memorizing a current maximum size of the heap memory.

In one aspect of the method the garbage collector is run following execution of each of the program instructions in the sequence.

According to an additional aspect of the method, the program instructions are software code.

According to still another aspect of the method, the program instructions are embedded in a hardware device.

In yet another aspect of the method the current size of the heap memory is added to a plot on a screen display.

According to a further aspect of the method, the application is a MIDlet adapted to execute on a mobile information device.

According to another aspect of the method, the mobile information device is MIDP compliant.

One aspect of the method includes determining whether the current size of the heap memory exceeds a predetermined value.

The invention provides a computer software product, including a computer-readable medium in which computer program instructions are stored, which instructions, when read by a computer, cause the computer to perform a method, which is carried out by executing a sequence of the program instructions of an application, running a garbage collector following execution of at least designated ones of the program instructions to free a portion of a heap memory that can no longer be used. After running the garbage collector, the method is further carried out by determining a current size of the heap memory, comparing the current size of the heap memory with a previous maximum size of the heap memory, and responsively to the comparison, memorizing a current maximum size of the heap memory.

In an aspect of the computer software product the garbage collector is run following execution of each of the program instructions in the sequence.

Another aspect of the computer software product includes determining whether the current size of the heap memory exceeds a predetermined value.

The invention provides a development system for evaluating memory requirements of a computer application, including a user interface adapted for executing code of the application, wherein the user interface is further adapted for identification of a range of successive locations in the code at which garbage collection is to be performed. The development system further includes a memory storing a maximal value of a heap, and containing a data structure, the data structure including computer instructions that are invokable via the user interface for allocation of the heap, including a first instruction to invoke a garbage collector for the heap when instructions of the range are is executed, a second instruction to return a current size of the heap that is still in used by the application, and a third instruction for storing a larger value of the stored maximal value and the current size in the location.

According to an additional aspect of the development system, the code is software code.

According to still another aspect of the development system, the code is stored in hardware.

According to yet another aspect of the development system, the user interface has a program for plotting the current size on a screen display.

According to a further aspect of the development system, the application is a MIDlet adapted to execute on a mobile information device.

According to another aspect of the development system, the mobile information device is MIDP compliant.

According to one aspect of the development system, the data structure includes a program that reports a determination whether the current size of the heap exceeds a predetermined value.

BRIEF DESCRIPTION OF THE DRAWINGS

For a better understanding of these and other objects of the present invention, reference is made to the detailed description of the invention, by way of example, which is to be read in conjunction with the following drawings, wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

Although the embodiments described in this provisional patent application make use of particular features and vocabulary of the Java language and operating environments, and refer specifically to mobile device applications, the present invention is not limited to this context or to the particular implementation tools described here. Rather, the principles of the present invention may be applied using other programming languages, and may be used to solve problems of resource mismatches that may arise in development of applications for different sorts of target platforms.

A modification of a standard memory allocation function mallocHeapObject( ) is shown in Listing 1. Conventionally a call to the function mallocHeapObject( ) simply allocates a contiguous block of heap memory according to a parameter "size". According to a disclosed embodiment of the invention, the function mallocHeapObject( ) is modified by provision of a global Boolean variable "excessive_gc". A test of the variable excessive_gc is made in the function mallocHeapObject( ) prior to any attempt to allocate memory. If the variable excessive_gc is set, then the system garbage collector is immediately invoked, and there is a delay until garbage collection is complete. A parameter having a value 0 in the parameter list of the garbage collector indicates that all heap memory is to be swept. Heap memory is allocated upon completion of garbage collection. Following a successful memory allocation, the amount of memory actually used by the calling application is available in a global variable "memory_used". Prior to exiting the function mallocHeapObject( ) a test of another global Boolean variable "trace_usage" is made. If the variable trace_usage is set, then a display of memory usage is activated. This is explained in further detail hereinbelow.

First Embodiment.

Figure 1:
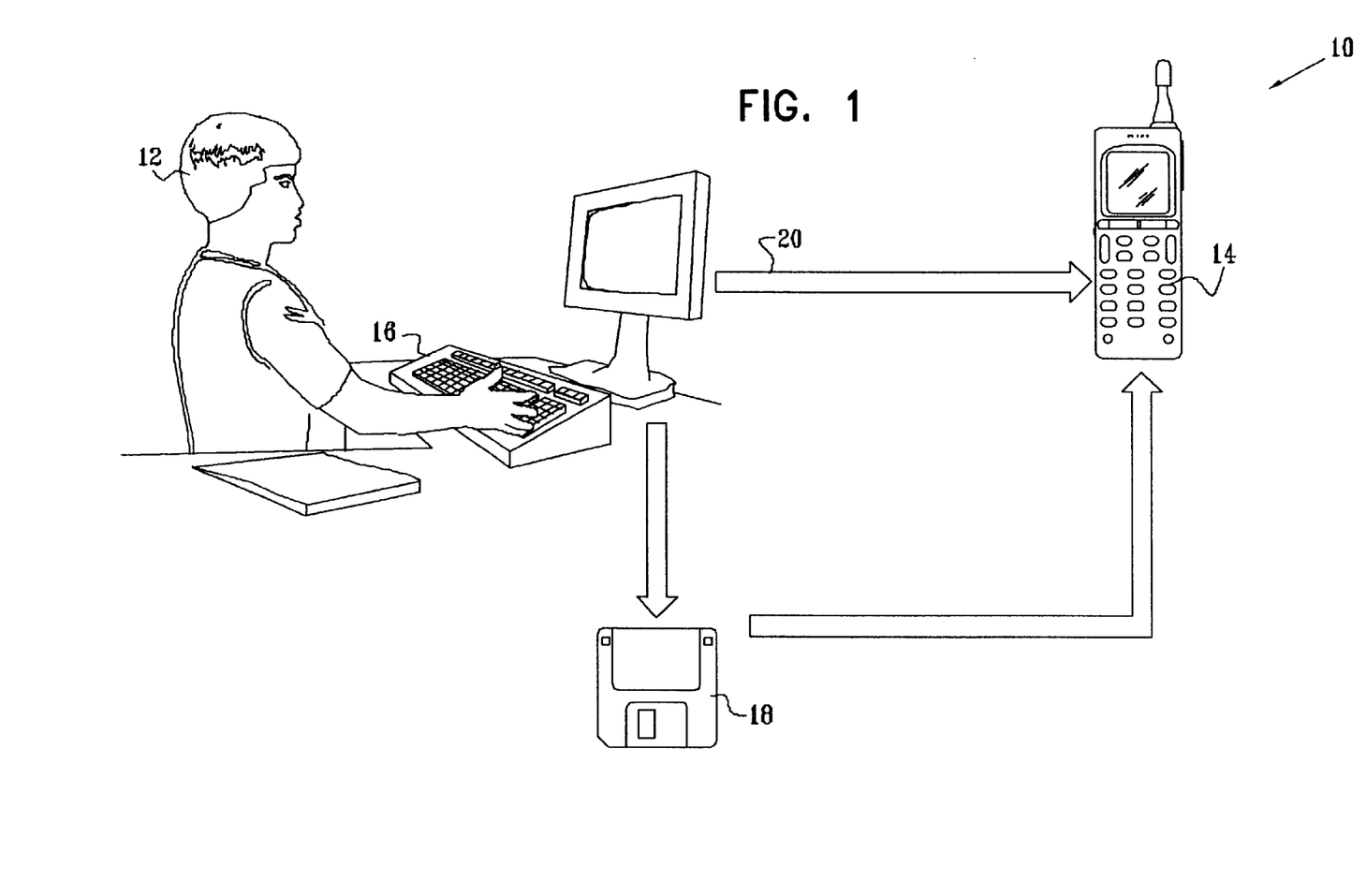
FIG. 1 is a high level block diagram of a system adapted to determine the amount of memory that is in use during development of an application for a target device in accordance with a disclosed embodiment of the invention.

Reference is now made to FIG. 1, which is a high level block diagram of a system 10 adapted to determine the amount of memory that is in use during development of an application for a target device in accordance with a disclosed embodiment of the invention. Typically, a developer 12 is attempting to create an application for a mobile information device 14, which can be MIDP compliant. The application may be ultimately embedded in hardware or installed in a memory as software. Typically, development is done using a conventional workstation 16, such as a personal computer, and then the application is transferred to the mobile information device 14 as a computer software product stored on a memory device 18 that is adapted to the mobile information device 14. Alternatively, the application can be downloaded to the mobile information device 14 via a link 20. The application can then be tested in the operating environment of the mobile information device 14. As memory on the mobile information device 14 is generally a critical resource, the developer 12 needs to determine the amount of memory that is in use in a heap at specific points in the application. Additionally or alternatively, it may be desired to assure that no more memory than necessary is allocated to the application under development at specific points during its execution. For example, it may be required that the application under development never causes other concurrently executing applications to be starved for memory.

Figure 2:
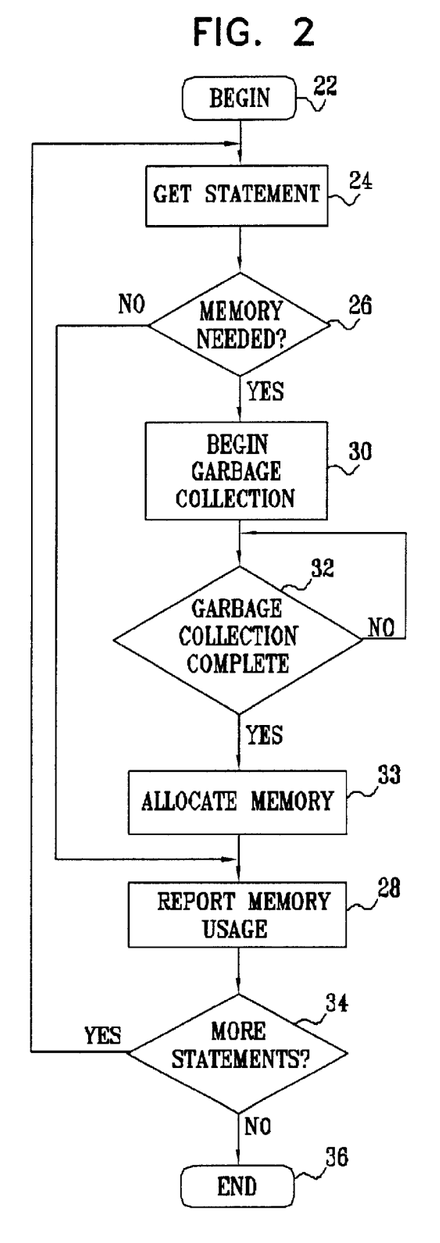
FIG. 2 is a flow chart illustrating a method for the application of a memory allocation function according to a disclosed embodiment of the invention.

Reference is now made to FIG. 2, which is a flow chart illustrating the application of the function mallocHeapObject( ) according to a disclosed embodiment of the invention suitable for use with the system 10 (FIG. 1). The process begins at initial step 22 at which program development is commenced. Next, at step 24 a program statement is read from working memory and evaluated.

Control now passes to decision step 26, where a determination is made whether the program statement developed in step 24 requires memory to be allocated for an object. If the determination at decision step 26 is negative, then control proceeds to step 28, which is disclosed below.

If the determination at decision step 26 is affirmative, then control proceeds to step 30. Garbage collection is begun. Control then proceeds to delay step 32, where the completion of garbage collection is awaited.

Upon completion of the delay step 32, memory is allocated at step 33 for the object as determined in decision step 26.

Next control proceeds to step 28. Step 28 is also performed in the event that the determination at decision step 26 was negative. Here memory usage by the application is reported. This can be done on a console display, or via a graphical user interface. Alternatively, the memory usage can be written to a log file. It will be noted that step 28 is performed regardless of whether step 30 needed to be performed. This is useful for plotting memory use against the number of program statements, and for verifying that no adverse events have occurred, for example unintended memory deallocations.

Next, at decision step 34 a determination is made whether more program statements remain to be written. If the determination at decision step 34 is affirmative, then control returns to step 24.

If the determination at decision step 34 is negative, then control proceeds to final step 36, and the process ends.

Figure 3:
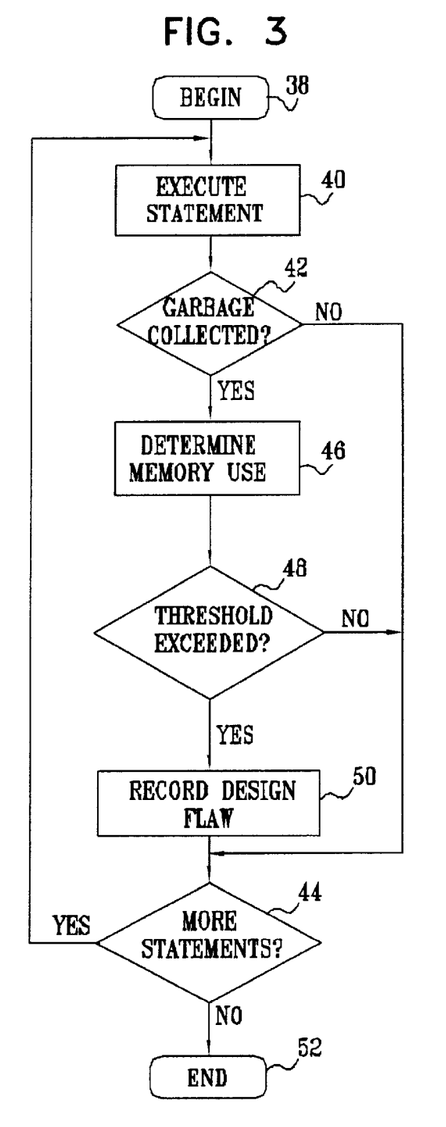
FIG. 3 is a flow chart illustrating a practical use of the method disclosed with reference to FIG. 2.

Reference is now made to FIG. 3, which is a flow chart illustrating a practical use of the method disclosed with reference to FIG. 2, in which the developer can determine if a predetermined memory size specification of a program is exceeded. It is to be emphasized that the process disclosed with reference to FIG. 3 is exemplary. Many other valuable uses for the inventive method may occur to those engaged in the art of software development. The process begins at initial step 38. A program written using the method of FIG. 2 is prepared for execution. The developer may execute the program step-wise, or alternatively, he may elect to perform a continuous execution, and perform the steps disclosed below as a retrospective analysis with reference to appropriate log files.

At step 40 a program statement is executed. Control then passes to decision step 42, where it is determined whether garbage collection occurred during step 40. If the determination at decision step 42 is negative, then control proceeds to decision step 44, which is disclosed below.

If the determination at decision step 42 is affirmative, then at step 46 the amount of memory used by the program is noted.

Control now passes to decision step 48, where it is determined whether the quantity of memory used that was noted in step 46 exceeds a specified threshold. If the determination at decision step 48 is negative, then control proceeds to decision step 44, which is disclosed below.

If the determination at decision step 48 is affirmative, then at step 50 it is recorded that a design flaw was revealed at the program statement that was executed in step 40. Control proceeds to decision step 44.

At decision step 44 a determination is made whether more program statements remain to be executed, or retrospectively analyzed. If the determination at decision step 44 is affirmative, then control returns to step 40.

If the determination at decision step 44 is negative, then the process ends at final step 52.

Second Embodiment.

While a near optimum use of memory is achieved using the first embodiment, there are circumstances in which it is necessary to guarantee that the use of memory by an executing application does not exceed its theoretical minimum. The second embodiment is similar to the first embodiment, except now garbage collection is invoked between each pair of program instructions. In one variation, garbage collection can be forced by simply calling the garbage collector. This may be done directly, provided the garbage collector is exposed to the programmer. Otherwise, the function mallocHeapObject( ) (Listing 1) may be called, setting the parameter size to a value of zero. In such a case, the garbage collector is invoked as a side effect of the function, but the amount of memory allocated to the program does not change. The technique is illustrated by the pseudocode fragment of Listing 2. It should be noted that allocations of memory by program instructions are irrelevant, in that they do not instigate garbage collection.

Some programming environments support memory monitors, which can be activated during step-wise program execution. If a memory monitor is available, explicit calls to the function mallocHeapObject( ) need not be written as shown in Listing 2. Instead, calls to the garbage collector and the display of current memory use by the application are automatically accomplished by the system kernel at or following execution of each program instruction.

Figure 4:
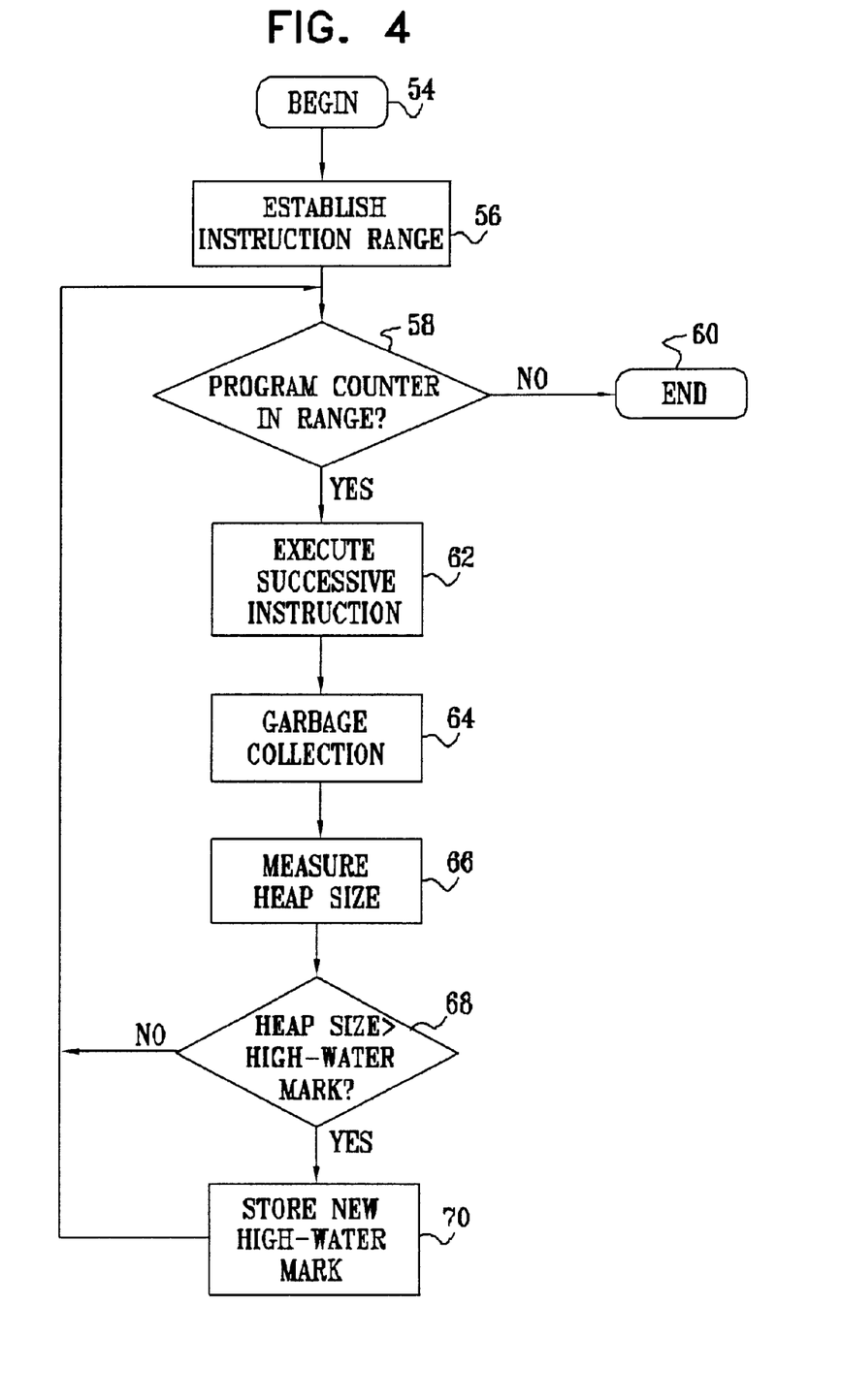
FIG. 4 is a flow chart illustrating a method of determining the maximum memory requirement of an application at any point through continuous use of garbage collection according to an alternate embodiment of the invention.

Reference is now made to FIG. 4, which is a flow chart illustrating a method of determining the maximum memory requirement of an application at any point through continuous use of garbage collection according to the second embodiment of the invention. The process begins at initial step 54 where an application to be tested is installed in a development platform. The development platform can be a target device, such as a mobile information device, or a general purpose computer, operating in an emulation mode if necessary, in order to execute the instructions of the target device.

Next, at step 56 a range of program instructions in the code is established for testing. The maximum heap memory requirements of the application will be determined by testing successive instructions within the range. The range may encompass all pairs of instructions between the first and the last instruction of the application, or can be a smaller range. A memory location is designated to hold a high-water mark of the heap size for the application as execution proceeds and is initialized to zero.

Next, at decision step 58 a determination is made whether instructions are executing within the range selected in step 56. This is typically done by examining the state of the program counter. If the determination at decision step 58 is negative, then control proceeds to final step 60, and the procedure terminates. The value of the high-water mark stored in the memory location that was reserved for the high-water mark in step 56 is reported to the operator.

If the determination at decision step 58 is affirmative, then control proceeds to step 62. A program instruction is executed. Typically, a program counter is advanced following completion of the instruction.

Next, at step 64, garbage collection is performed. Intensive invocation of the garbage collection routine following each instruction may delay completion of the application, but provides valuable information to the developer.

Next, at step 66, the current heap size is determined.

Next, at decision step 68 a determination is made whether the heap size that was determined in step 66 exceeds the contents of the memory location that was reserved for the high-water mark in step 56.

If the determination at decision step 68 is negative, then control returns to decision step 58.

If the determination at decision step 68 is affirmative, then control proceeds to step 70. A new high-water mark or maximum heap size for the application is established control. The heap size that was determined in step 66 is stored in the memory location that was reserved for the high-water mark in step 56. Control then returns to decision step 58.

Figure 5:
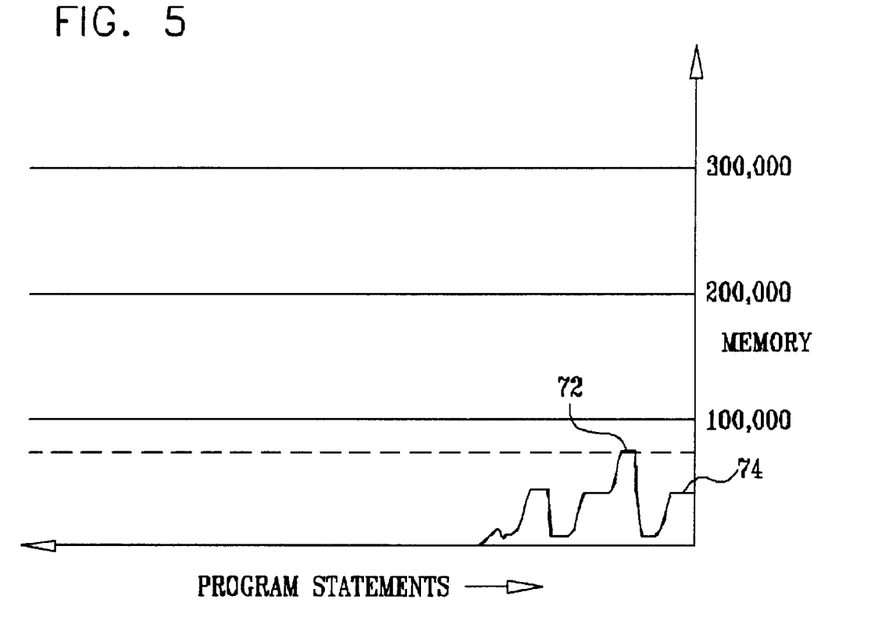
FIG. 5 is a plot of memory use by a test application for a mobile information device, which was taken from a screen display of a memory monitor in accordance with a disclosed embodiment of the invention, in which intensive garbage collection was not performed.

Reference is now made to FIG. 5, which is a plot of memory use of a test application for a mobile information device, which was taken from a screen display of a memory monitor in accordance with a disclosed embodiment of the invention. The function mallocHeapobject( ) (Listing 1) was called during execution in the manner disclosed for the second embodiment. The variable trace_usage was set, thereby enabling operation of the memory monitor. However, the variable excessive_gc was not set. Thus, the function mallocHeapObject( ) behaved as a conventional memory allocation function, without intensive garbage collection. The maximum memory usage, 94,280 bytes, is found at a statement 72, as measured by the memory monitor. A current statement 74 is associated with a memory usage of 52,892 bytes.

Figure 6:
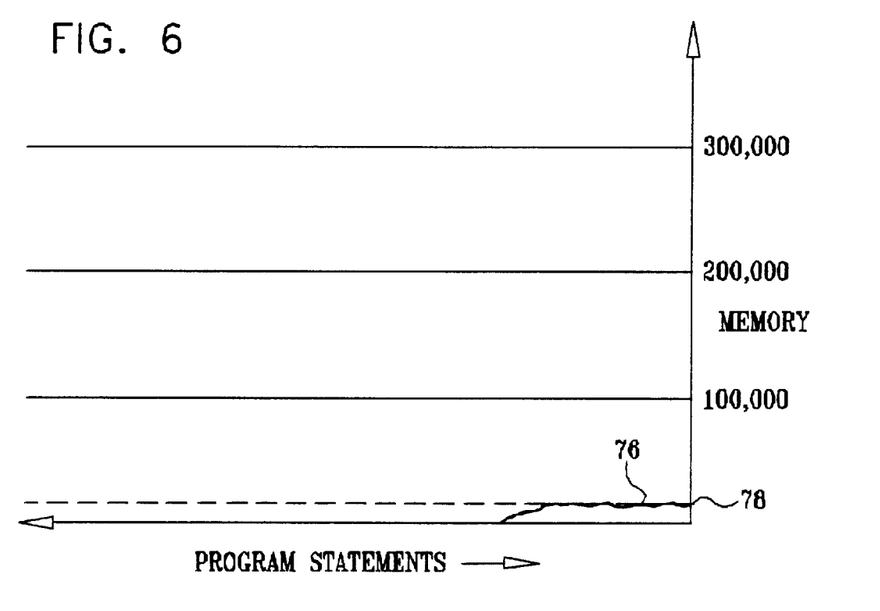
FIG. 6 is a plot of memory use of the test application of FIG. 5, which was taken from a screen display of a memory monitor in accordance with a disclosed embodiment of the invention, in which intensive garbage collection was performed.

Reference is now made to FIG. 6, which is a plot of memory use of the test application shown in FIG. 5 in accordance with a disclosed embodiment of the invention. The plot was taken under the same conditions as that of FIG. 5, except that the variable excessive_gc was set. A statement 76 and a statement 78 correspond respectively to the statement 72 and the statement 74. The memory usage associated with the statement 76 was measured maximally at 11,980 bytes. At the statement 78, the memory usage was measured at 9,304 bytes. The difference between the plot of FIG. 5 and FIG. 6 may be attributed to intensive collection of inaccessible objects during the execution illustrated in FIG. 6.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

45701                                                              Ver. 45701S3

COMPUTER PROGRAM LISTINGS

Listing 1

```
* = = = = = = = = = = ====== = = = = = = = = = = = = */
* FUNCTION: mallocHeapObject()
* TYPE:public memory allocation operation
* OVERVIEW: Allocate a contiguous area of n cells in the
* dynamic heap.
* INTERFACE:
* parameters: size: the requested object size in cells,
* returns: pointer to newly allocated area, or
* NULL if allocation fails.
* = = = = = = = = = = ====== = = = = = = = = = = = = */
```

P7967

45701                                                    Ver. 45701S3

16

```
cell* mallocHeapObject (long size)
{
    cell* thisChunk;
    if (excessive_gc) {
      garbageCollect (0);
    } thisChunk = allocateFreeChunk(size);

/* allocation failed, run garbageCollect() */
    if (thisChunk == NULL) {
      garbageCollect(size); /* So it knows what we need */
      thisChunk = allocateFreeChunk(size);

if (thisChunk == NULL) {
        /* allocation failed, not enough memory */
        return NULL;
      }
    } if (max_memory < memory_used) max_memory = memory_used;
    if (trace_memory) show_memory_usage();

}
```

Listing 2

```
    Statement 1;
#if DEBUG
    mallocHeapObject(0);
#endif
    Statement 2;
#if DEBUG
    mallocHeapObject(0);
#endif
    Statement 3;
    .
    .
    .
```

What is claimed is:

1. A method for evaluating maximum memory requirements of a computer application on a development platform, comprising the steps of:
executing a sequence of program instructions in said application;
running a garbage collector following execution of at least designated ones of said program instructions to free a portion of a heap memory that is no longer in use;
after running said garbage collector, determining a current size of said heap memory;
comparing said current size of said heap memory with a previous maximum size of said heap memory; and
responsive to said step of comparing, memorizing a current maximum size of said heap memory.

2. The method according to claim 1, wherein said step of running a garbage collector is performed following execution of each of said program instructions in said sequence.

3. The method according to claim 1, wherein said program instructions are software code.

4. The method according to claim 1, wherein said program instructions are embedded in a hardware device.

5. The method according to claim 1, further comprising adding said current size of said heap memory to a plot on a screen display.

6. The method according to claim 1, wherein said application is a MIDlet adapted to execute on a mobile information device.

7. The method according to claim 6, wherein said mobile information device is MIDP compliant.

8. The method according to claim 1, further comprising the step of determining whether said current size of said heap memory exceeds a predetermined value.

9. A computer software product, comprising a computer-readable medium in which computer program instructions are stored, which instructions, when read by a computer, cause the computer to perform a method comprising the steps of:
executing a sequence of said program instructions of an application;
running a garbage collector following execution of at least designated ones of said program instructions to free a portion of a heap memory that can no longer be used;
after running said garbage collector, determining a current size of said heap memory;
comparing said current size of said heap memory with a previous maximum size of said heap memory; and
responsive to said step of comparing, memorizing a current maximum size of said heap memory.

10. The computer software product according to claim 9, wherein said step of running a garbage collector is performed following execution of each of said program instructions in said sequence.

11. The computer software product according to claim 9, wherein said program instructions are software code.

12. The computer software product according to claim 9, wherein said program instructions are embedded in a hardware device.

13. The computer software product according to claim 9, further comprising adding said current size of said heap memory to a plot on a screen display.

14. The computer software product according to claim 9, wherein said application is a MIDlet adapted to execute on a mobile information device.

15. The computer software product according to claim 14, wherein said mobile information device is MIDP compliant.

16. The computer software product according to claim 9, further comprising the step of determining whether said current size of said heap memory exceeds a predetermined value.

17. A development system for evaluating memory requirements of a computer application, comprising:
a user interface adapted for executing code of said application, said user interface being further adapted for identification of a range of successive locations in said code at which garbage collection is to be performed;
a memory, comprising a location holding a stored maximal value of a heap, and containing a data structure, said data structure including computer instructions that are invokable via said user interface for allocation of said heap, comprising:
a first instruction to invoke a garbage collector for said heap when instructions of said range are being executed;
a second instruction to return a current size of said heap that is still being used by said application;
a third instruction for storing a larger value of said stored maximal value and said current size in said location.

18. The development system according to claim 17, wherein said code is software code.

19. The development system according to claim 17, wherein said code is stored in hardware.

20. The development system according to claim 17, wherein said user interface has a program for plotting said current size on a screen display.

21. The development system according to claim 17, wherein said application is a MIDlet adapted to execute on a mobile information device.

22. The development system according to claim 21, wherein said mobile information device is MIDP compliant.

23. The development system according to claim 17, wherein said data structure comprises a program that reports a determination whether said current size of said heap exceeds a predetermined value.

* * * * *